United States Patent

Baumann et al.

[11] Patent Number: 6,099,964
[45] Date of Patent: Aug. 8, 2000

[54] METAL DEPOSITS ON MESOSCOPIC ORGANOPOLYSILOXANE PARTICLES

[75] Inventors: Frank Baumann, Mehring; Bernward Deubzer, Burghausen; Manfred Schmidt, Bodenheim, all of Germany

[73] Assignee: Wacker-Chemie GmbH, München, Germany

[21] Appl. No.: 09/017,638

[22] Filed: Feb. 2, 1998

[30] Foreign Application Priority Data

Feb. 6, 1997 [DE] Germany .......................... 197 04 583

[51] Int. Cl.$^7$ .......................... B32B 15/02; B32B 17/02; B32B 19/00; B32B 21/02; B32B 23/02
[52] U.S. Cl. .............................. 428/402; 528/34; 528/15; 528/19; 524/268
[58] Field of Search .............................. 428/402; 528/34; 528/15, 19; 526/906; 524/268

[56] References Cited

U.S. PATENT DOCUMENTS

| | | |
|---|---|---|
| 3,795,656 | 3/1974 | Martin et al. ...................... 260/46.5 E |
| 4,398,010 | 8/1983 | Adkins ...................... 528/15 |
| 5,071,808 | 12/1991 | Autberg et al. .......................... 502/107 |
| 5,352,791 | 10/1994 | Pauster et al. ............................ 546/165 |
| 5,561,231 | 10/1996 | Dauth et al. ................................ 546/2 |
| 5,786,413 | 7/1998 | Weidner et al. ......................... 524/268 |
| 5,854,369 | 12/1998 | Geck et al. .............................. 528/30 |

FOREIGN PATENT DOCUMENTS

| | | |
|---|---|---|
| 0372414 | 6/1990 | European Pat. Off. . |
| 0507132 | 10/1992 | European Pat. Off. . |
| 0638604 | 2/1995 | European Pat. Off. . |
| 0722970 | 7/1996 | European Pat. Off. . |
| 0744432 | 11/1996 | European Pat. Off. . |
| 19536182 | 4/1997 | Germany . |

OTHER PUBLICATIONS

The effect of precursor structure as the preparation of Pt/SiO$_2$ catalysts "by the sol–gel method" by Weiging Zou et al., Materials Letters 24 (1995) 35–39.
Autarietti et al., Nacht. Chem. Lab. 44, 1996, 6, p. 579.
Derwent Abstract coresponding to EP 0744432.
Derwent Abstract corresponding to EP 0722970.

*Primary Examiner*—William Krynski
*Assistant Examiner*—B. Shewareged
*Attorney, Agent, or Firm*—Brooks & Kushman P.C.

[57] ABSTRACT

Organopolysiloxane particles consist of a single molecule, are crosslinked, and contain metal atoms in the zero valent oxidation state, the metal atoms in each case being in intermetallic interaction with at least one further metal atom in the zero valent oxidation state, have an average diameter of 5 to 200 nm and are soluble to the extent of at least 0.1% by weight in at least one organic solvent chosen from the group consisting of methylene chloride, pentane, acetone, toluene and ethanol, at least 80% of the particles having a diameter which deviates from the average diameter by not more than 30%.

16 Claims, No Drawings

METAL DEPOSITS ON MESOSCOPIC ORGANOPOLYSILOXANE PARTICLES

TECHNOLOGICAL FIELD

The invention relates to monodisperse, soluble organopolysiloxane particles which consist of a single molecule and comprise metal atoms in the zero valent oxidation state with intermetallic interaction, their preparation and their use. The organopolysiloxane particles have an average diameter of 5 to 200 nm and are therefore in the mesoscopic size range.

DESCRIPTION OF THE RELATED ART

The deposition of metals or metal alloys on substrate surfaces, usually silicic acids or active charcoal, is known. W. Zou et al., Materials Letters, 24 (1995), 35–39 describes the preparation of macrogels which have an intercollated metal salt by a sol-gel process starting from metal salt solutions and tetraethoxysilane. Platinum-, palladium- or iridium-containing silica gels are obtained by subsequent reductive calcining of the ground gels. The metal-coated substrates prepared in this way are chiefly used as heterogeneous catalysts, for example for hydrogenation of carbon-carbon double bonds or in the detoxification of waste gas. However, these catalyst systems have all the disadvantages of a heterogeneous catalyst, such as relatively low activity because of the low catalytically active surface area and low selectivity. Furthermore, the metal particle size, which is important for the catalytic processes, is established rather randomly. The location of the metal particles also depends on the process procedure during gelling, and the metal content accessible for catalytic reactions is therefore difficult to adjust.

An improvement is provided by the known preparation of defined metal colloids, which are stable in solution, by in situ reduction and stabilization, for example in a microemulsion or inverse microemulsion, or by electrochemical reduction of metal salts in the presence of surfactants having a stabilizing action. It is known from Antonietti et al., Nachr. Chem. Lab. 44, 1996, 6, page 579 that the stabilization of these colloidal particles by means of a surfactant ceases under more severe conditions, such as elevated temperature, increased salt content and aggressive reaction media. Colloidal aggregates of lower reactivity and selectivity are formed under these conditions.

Another method of stabilization of metal colloids, produced in situ by reduction in the presence of amphiphilic block copolymers, such as polystyrene/polyacrylic acid copolymers, is described in Antonietti et al., Nachr. Chem. Lab. 44, 1996, 6, page 579. The advantage of these systems is a substantially lower sensitivity to changes in temperature, to the chemical environment, and to salt effects. Furthermore, the metal colloids stabilized in this way are redispersible in organic solvents after drying out. However, this variant also has some disadvantages. Thus, the synthesis of the amphiphilic block copolymers is associated with a high synthesis cost, and furthermore, the colloid particle size cannot be controlled easily because of the influence of the reduction conditions, such as temperature, solvent, reducing agent and metal salt precursor. Finally, active metal centers inside the metal colloids are inaccessible. Another disadvantage is that an external reducing agent, such as hydrazine or sodium borohydride, must always be added for reduction of the metal salt. The reducing agent also considerably influences the resulting metal colloid size and distribution via nucleation processes, and is thus another uncertainty factor in controlled adjustment of the colloid particle size. These colloidal metal systems described to date are also limited only to the organic phase.

No controlled layer build-up of metal nano-structures is possible by the methods described above, and only random metal alloys can be prepared, if at all.

An object of the subject invention is to provide organopolysiloxane particles which are soluble in organic solvents, which have metal deposits, and which have a monodisperse particle size distribution within a size range of from 5 to 200 nm.

SUMMARY OF THE INVENTION

The invention relates to crosslinked organopolysiloxane particles which consist of a single molecule, and contain metal atoms in the zero valent oxidation state, these atoms in each case being in intermetallic interaction with at least one further metal atom in the zero valent oxidation state, the particles having an average diameter of 5 to 200 nm and being soluble to the extent of at least 0.1% by weight in at least one organic solvent chosen from the group consisting of methylene chloride, pentane, acetone, toluene and ethanol, at least 80% of the particles having a diameter which deviates from the average diameter by not more than 30%.

DETAILED DESCRIPTION OF THE INVENTION

The organopolysiloxane particles typically have mean molar masses of at least 104 g/mol, in particular $5\times10^5$ g/mol, and preferably not more than $10^{10}$ g/mol, in particular $10^9$ g/mol. The average diameters of the metal-containing organopolysiloxane particles are preferably between 10 and 200 nm. Preferably, 80% of the particles have a diameter which deviates from the average diameter by not more than 20%, in particular not more than 10%. The metal-containing organopolysiloxanes are preferably spherical particles.

The metal-containing organopolysiloxane particles are soluble in solvents and can therefore be employed, for example, as homogeneous catalysts, in which, however, the catalytically active metal is immobilized in the form of colloids, clusters, or layers on the organopolysiloxane particle surface, thus also offering the advantages of a heterogeneous catalyst. The solubility in a solvent is preferably at least 0.01% by weight, in particular at least 0.1% by weight. The solvents in which the metal-containing organopolysiloxane particles dissolve depend, on the one hand on the build-up of the organopolysiloxane particles, and on the other hand, on the nature and density of the metal covering on the particle surface. There is at least one suitable solvent for all metal-containing organopolysiloxane particles. Examples of such solvents are alcohols such as methanol, ethanol, n-propanol and isopropanol; ethers such as dioxane, tetrahydrofuran, diethyl ether and diethylene glycol dimethyl ether; chlorinated hydrocarbons such as methylene chloride, chloroform, carbon tetrachloride, 1,2-dichloroethane and trichloroethylene; saturated hydrocarbons such as pentane, n-hexane, cyclohexane, hexane isomer mixtures, heptane, octane, petroleum distillate or petroleum ether; aliphatically unsaturated hydrocarbons, in particular alkenes, such as pentene, hexene or octene, dienes, such as hexadiene or cyclooctadiene; alkynes such as butyne; aromatic hydrocarbons such as benzene, toluene or xylenes; ketones such as acetone, methyl ethyl ketone, methyl isobutyl ketone or cyclohexanone; nitrogen-containing organic solvents, such as nitrobenzene, nitromethane or dimethylformamide; sulfur-containing organic solvents such as carbon disulfide; and oligomeric and polymeric siloxanes with optional functional groups such as vinyl groups, for example α,ω-vinyl-terminated dimethylpolysiloxanes; mixtures of these solvents, as well as monomers such as methyl methacrylate or styrene, and liquid polymers. The metal-coated particles are also redispersible in water to the extent of at least 0.1% by weight.

The atomic properties of an individual metal atom in the zero valent oxidation state in the organopolysiloxane particles are annulled; metal units are present, but still no metallic solid. The properties of the metal units lie between the properties of an individual atom and those of a metallic solid. The conduction bands of the individual atoms approach each other. The energy interval from the base level to the conduction band decreases. Preferably, at least 3, in particular at least 5 metal atoms of the zero valent oxidation state are in intermetallic interaction with one another.

The relative total content of metal in the zero valent oxidation state of the organopolysiloxane particles is at least 10 ppm, preferably at least 0.1% by weight, in particular at least 1% by weight, and preferably not more than 50% by weight, more preferably not more than 10% by weight, and in particular not more than 5% by weight. The relative metal content can be determined by elemental analysis.

The organopolysiloxane particles can contain any desired metal atoms in the zero valent oxidation state. The metals preferably chosen are those which can be reduced from their compounds by reducing agents such as alcohols, aldehydes, hydrazine, sodium borohydride or hydridosilanes or -siloxanes, or by UV irradiation, i.e. their redox potential in the chemical environment existing in each case is greater than that of the particular reducing agent. For the example of the silicon hydride bond, all metals of which the redox potential in the particular chemical environment is greater than the defined zero in relation to hydride-hydrogen transfer can therefore be deposited starting from their metal salts. This applies, for example, to all noble metals, such as platinum, palladium, rhodium, rhenium, gold, silver, iridium and the like, and also to, for example, copper, bismuth and cobalt.

In the crosslinked organopolysiloxane particles, the metal atoms in the zero valent oxidation state can be in a different accumulation at various points. One metal and also various metals can be present in one organopolysiloxane particle, it also being possible for various metals to be present at various points in the organopolysiloxane particle.

For example, the metal atoms may be on the organopolysiloxane particle surface, where they may then be present, depending on the covering density, in the form of clusters of metal deposits up to 1 nm diameter; colloids with structures of more than 1 nm diameter which are clearly detectable as individual particles on the organopolysiloxane; or in a complete metal layer. In spite of a high covering of metal, no metal structures are detectable in these structures under a particle electron microscope. The plasmon resonance can be measured by UV.

For example, a layer build-up is possible, and can be structured, for example, as follows:

1) organopolysiloxane core
2) first metal deposit
3) organopolysiloxane layer
4) second metal deposit This layer structure is also optionally possible without a siloxane intermediate layer, it being possible for another metal layer to be present on the second layer. Further layers can also be built up in this manner. The metal deposits, such as 2. and 4., can be present as a complete metal layer, metal clusters or metal colloids.

Another variant of the layer build-up is a metal layer applied to an organopolysiloxane core and an organopolysiloxane network of defined network mesh size and defined chemical environment built up around this metal layer. Such organopolysiloxane particles can be employed both as a size-selective and as a chemically specific catalyst.

The metal deposits on the organopolysiloxane particle surface which are described above can furthermore carry complexing ligands on the metal surface, such as molecules of the above solvents or anions or neutral ligands resulting from the preparation process, such as chloride, nitrate and cyclooctadiene.

The organopolysiloxane content of the organopolysiloxane particles preferably essentially consists of 0.5 to 80% by weight of units of the general formula $$[R_3SiO_{1/2}] \qquad (1),$$

0 to 99.0% by weight of units of the general formula $$[R_2SiO_{2/2}] \qquad (2),$$

0 to 99.5% by weight of units of the general formula $$[RSiO_{3/2}] \qquad (3),$$

and, 0 to 99.5% by weight of units of the general formula $$[SiO_{4/2}] \qquad (4),$$

in which
R is a hydrogen atom or identical or different monovalent, SiC-bonded, $C_1$ to $C_{18}$ hydrocarbon radicals which optionally carry functional groups.

Examples of unsubstituted radicals R are alkyl radicals such as the methyl, ethyl, n-propyl, isopropyl, n-butyl, iso-butyl, tert-butyl, n-pentyl, isopentyl, neo-pentyl or tert-pentyl radical, hexyl radicals such as the n-hexyl radical, heptyl radicals such as the n-heptyl radical, octyl radicals such as the n-octyl radical, and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, 4-ethylcyclohexyl and cycloheptyl radicals, norbornyl radicals and methylcyclohexyl radicals; aryl radicals such as the phenyl, naphthyl, anthryl, and phenanthryl radicals; alkaryl radicals such as o-, m- and p-tolyl radicals, xylyl radicals and ethylphenyl radicals; and aralkyl radicals such as the benzyl radical and the alpha- and β-phenylethyl radicals.

Examples of hydrocarbon radicals R which carry functional groups are halogenated hydrocarbon radicals, in particular haloalkyl radicals such as the chloromethyl, 3-chloropropyl, 3-bromopropyl, 3,3,3-tri-fluoropropyl and 3,3,4,4,5,5,5-heptafluoropentyl radical; and haloaryl radicals such as the o-, m- and p-chlorophenyl radicals; hydrocarbon radicals which carry primary, secondary and tertiary amines, for example aminoalkyl radicals such as the 2-aminoethyl, 3-amino-propyl, N-(2-aminoethyl), 3-aminopropyl, N-(2-aminoethyl)-3-amino-(2-methyl) propyl and pyrimidinyl radicals, and aminoaryl radicals such as the aminophenyl radical; quaternary ammonium radicals; hydrocarbon radicals which carry mercapto groups such as the 2-mercaptoethyl and 3-mercaptopropyl radicals; cyanoalkyl radicals such as the 2-cyanoethyl and 3-cyanopropyl radical; hydrocarbon radicals which carry acrylic groups, for example acryloxyalkyl radicals such as the 3-acryloxypropyl and 3-methacryloxypropyl radical; hydrocarbon radicals which carry hydroxyl groups, for example hydroxyalkyl radicals, such as the hydroxypropyl radical; hydrocarbon radicals which carry phosphonic acid, phosphonato, and sulfonato groups; and unsaturated hydrocarbon radicals which are interrupted by the heteroatoms O, N or S, such as the furanyl, pyridyl or thiophenyl radicals.

The radical R is preferably selected from unsubstituted $C_1$- to $C_6$-alkyl radicals, phenyl radicals or hydrogen, in particular, the methyl radical.

The organopolysiloxane content in the enveloping siloxane layers of the organopolysiloxane particles can have a composition the same as or different to that in the underlying siloxane core. The siloxane shell preferably has a thickness of 1 to 10 nm, in particular not more than 5 nm, and particularly preferably not more than 2 nm.

In particular, the organopolysiloxane particles comprise at least 0.1% by weight of metal and the organopolysiloxane content of the organopolysiloxane particles consists of 1 to 80% by weight of units of the general formula (1), 0 to 98% by weight of units of the general formula (2), 0 to 99% by weight of units of the general formula (3), and 0 to 99% by weight of units of the general formula (4), with the proviso that the sum of the units of the general formulae (3) and (4) is at least 1 by weight.

Metal-containing organopolysiloxane particles and organopolysiloxane shells which are built up at least to the extent of 80 mol % from units of the general formula (2) have elastomeric properties. These particles or siloxane envelopes built up in this way are swellable in the above organic solvents, in particular in toluene, tetrahydrofuran, dioxane, petroleum ether, chlorinated hydrocarbons and alkenes. In these swollen particles, metal clusters, colloids and layers lying inside are thus accessible for catalytic reactions, for example. At the same time, a size selectivity for the catalyzed reaction can be established via the adjustment of the mesh width in an enveloping swellable siloxane layer.

The invention furthermore relates to a process for the preparation of the metal-containing crosslinked organopolysiloxane particles consisting of a single molecule, in which A) the organopolysiloxane component of the organopolysiloxane particles is prepared as a colloidal suspension of organopolysiloxane particles in a first step by metering silanes of the general formula (5)

$$R_a Si(OR^1)_{4-a} \quad (5),$$

and, when appropriate, organosilicon compounds of the general formula (6)

$$R_b(R^1 O)_c SiO_{4-b-c/2} \quad (6),$$

in which $R^1$ has the meanings of R, a has the value 0, 1, 2 or 3, b and c in each case independently of one another have the values 0, 1, 2, 3 or 4 and R has the above meanings, into an agitated mixture of emulsifier and water and in a second step, an organosilicon compound of the general formula (7)

$$(R^2{}_3 Si)_d Y^1 \quad (7)$$

in which $Y^1$ if d=1, is a hydrogen atom, —$OR^3$, —$ONR^3{}_2$ or —$OOCR^3$ and if d=2, is —O— or —S—, $R^2$ and $R^3$ have the meanings of R and d has the value 1 or 2, is added to the colloidal suspension, with the proviso that the organosilicon compounds of the general formula (7) are water-soluble or hydrolyze in water to give a water-soluble compound.

Interparticulate condensation of the organopolysiloxane particles is prevented by saturating the condensable groups remaining after the first step with organosilicon compounds containing exclusively monofunctional triorganosilyl groups.

Preferably, no by-products, such as hydrochloric acid or ammonia, which substantially increase the ionic strength of the aqueous colloidal system are formed during the hydrolysis or condensation reaction of the organosilicon compounds of the general formula (7). Organosilicon compounds of the general formula (7) which are particularly preferably employed are trimethylmethoxysilane, trimethylethoxysilane, hexamethyldisiloxane, vinyldimethylmethoxysilane, vinyldimethylethoxysilane, 1,1,3,3-tetramethyldisiloxane and mixtures thereof.

When the second reaction step has ended, the organopolysiloxane particles can be isolated from the colloidal suspensions by known processes, for example by coagulation of the lattices by means of addition of salts or by addition of polar solvents.

After isolation of organopolysiloxane particles containing a total of more than 15% by weight of units of the general formulae (3) and (4), after the second step, an organosilicon compound of the general formulae (8) and/or (9)

$$(R^2{}_3 Si)_d Y^2 \quad (8)$$

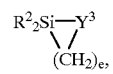

(9)

in which $Y^2$, if d=1, is a hydrogen or halogen atom, —$OR^3$, —$NR^3{}_2$, —$ONR^3{}_2$ or —$OOCR^3$ and if d=2, is —O—, —$N(R^3)$— or —S—, $Y^3$ is the radical —O—, —$N(R^3)$— or —S—, e is a value from 1 to 30, in particular 2, 3 or 4, and d, $R^2$ and $R^3$ have the above meanings, is added in a third reaction step in an aprotic solvent.

Organosilicon compounds of the general formula (8) are preferably employed in the third step.

Organosilicon compounds of the general formula (8) which are particularly preferably employed in this third reaction step are trimethylchlorosilane, dimethylchlorosilane, vinyldimethylchlorosilane, hexamethyldisilazane, 1,3-divinyl-1,1,3,3-tetramethyldisilazane, or mixtures of disilazanes or chlorosilanes.

The amounts of compounds of the general formulae (5) to (9) employed are chosen such that the desired organopolysiloxane particles are obtained. The amounts of compounds of the formulae (5) and (6) employed are incorporated virtually quantitatively in the first reaction step and control the degree of crosslinking of the organopolysiloxane particles in aqueous suspension. The compounds of the general formula (7) or (8) and (9) employed in the second and, if appropriate, in the third reaction step are in each case employed in excess and are thus not incorporated completely into the organopolysiloxane particles. Preferably, 0.2 to 10, in particular 0.5 to 3 parts by weight of compounds of the general formula (7) in the second reaction step, or of the total of the compounds of the general formulae (7), (8) and (9) in the second and third reaction step are employed per part by weight of compounds of the general formulae (5) and (6).

If a third reaction step is carried out, the ratio of the amount of compounds of the general formula (7) employed in the second reaction step to the amount of compounds of the general formulae (8) and (9) employed in the third reaction step is preferably 1:10 to 2:1, in particular 1:5 to 1:1.

The radical $R^3$ is preferably unsubstituted $C_1$- to $C_6$-alkyl radicals or the phenyl radical, with methyl, ethyl and propyl radicals being particularly preferred.

Particularly suitable emulsifiers are alkyl sulfates, for example those having a chain length of 8–18 carbon atoms, and aryl and alkyl ether-sulfates having 8–18 carbon atoms in the hydrophobic radical and 1–40 ethylene oxide (EO) or propylene oxide (PO) units;

sulfonates, for example alkylsulfonates having 8–18 carbon atoms, alkylarylsulfonates having 8–18 carbon atoms and esters and half-esters of sulfosuccinic acid with monohydric alcohols or alkylphenols having 4–15 carbon atoms; if appropriate, these alcohols or alkylphenols ethoxylated with 1–40 EO units;

alkali metal and ammonium salts of carboxylic acids having 8–20 carbon atoms in the alkyl, aryl, alkaryl or aralkyl radical;

phosphoric acid partial esters and alkali metal and ammonium salts thereof, for example alkyl and alkaryl phosphates having 8–20 carbon atoms in the organic radical and alkyl ether- or alkaryl ether-phosphates having 8–20 carbon atoms in the alkyl or alkaryl radical and 1–40 EO units;

alkyl polyglycol ethers having 2–40 EO units and alkyl radicals of 4–20 carbon atoms;

alkylaryl polyglycol ethers having 2–40 EO units and 8–20 carbon atoms in the alkyl and aryl radicals;

ethylene oxide/propylene oxide (EO/PO) block copolymers having 8–40 EO and PO units;

fatty acid polyglycol esters having 6–24 carbon atoms and 2–40 EO units;

alkyl polyglycosides, naturally occurring substances and derivatives thereof, such as lecithin, lanolin, saponins and cellulose; and cellulose alkyl ethers and carboxyalkylcelluloses, the alkyl groups of which in each case have up to 4 carbon atoms;

linear organo(poly)siloxanes containing polar groups and having alkoxy groups with up to 24 carbon atoms and/or up to 4·EO and/or PO groups;

salts of primary, secondary and tertiary fatty amines having 8–24 carbon atoms with acetic acid, sulfuric acid, hydrochloric acid and phosphoric acids;

quaternary ammonium salts, such as halides, sulfates, phosphates, acetates or hydroxides, the alkyl groups of which independently of one another have 1–24 carbon atoms; if appropriate, the alkyl or alkaryl or aralkyl groups of the quaternary ammonium compounds can also be partly ethoxylated (1–40 EO units);

alkylpyridinium, alkylimidazolinium and alkyloxazolinium salts, the alkyl chain of which has up to 18 C atoms, in the form of their halides, sulfates, phosphates or acetates.

Aliphatically substituted benzenesulfonic acids and salts thereof and optionally partly ethoxylated quaternary ammonium halides and hydroxides are preferred. Dodecylbenzenesulfonic acid and benzyldimethyl-{2-[2-(p-1,1,3,3-tetramethylbutylphenoxy)ethoxy]-ethyl}ammonium chloride (benzethonium chloride) are particularly preferred.

The amount of emulsifier to be employed is 0.5 to 50% by weight, preferably 1.0 to 30% by weight, in each case based on the total amount of organosilicon starting compounds employed in the first and second reaction step. The organoslicon starting compounds of the general formulae (5) and (6) are preferably added in metered form during the first reaction step. Preferably, all the starting components of the general formulae (5) and (6) are mixed in the desired ratio before the metering during the first reaction step; in order to obtain a homogeneous mixture, if appropriate, 0.1–30% by weight, based on the sum of the starting components of the general formulae (5) and (6), of an alkanol of the formula $R^7OH$ in which $R^7$ is an alkyl radical having 1 to 5 carbon atoms, is additionally added as a solubilizing agent, the alkanols methanol and ethanol being particularly preferred.

The ethers, hydrocarbons, ketones and organopolysiloxanes described above, in particular tetrahydrofuran, cyclohexane, methylcyclohexane or toluene, are preferably used as the aprotic organic solvent in the third step. The reaction both in the first (emulsion polycondensation/addition polymerization) and in the second reaction step is preferably carried out at 5–95° C., more preferably at 10–85° C., and in particular preferably at 10–40° C. The pH is in each case 1–12, preferably 1–4, or 7–11, depending on the acid/base stability of the radicals R, $R^1$, $R^2$ and $R^3$ of the starting compounds (5) to (9).

In the preparation of the colloidal suspensions during the first reaction step, it is advantageous, for the stability of the emulsion, to subsequently stir the mixture for a further 1 to 24 hours after the end of metering of the organosilicon starting compounds of the general formulae (5) and (6). The alkanol liberated during the hydrolysis can be removed by distillation, if appropriate under reduced pressure, but this is not preferred. The solids content of the colloidal suspension prepared after the first step should preferably be not more than 25% by weight, since otherwise a high increase in the viscosity makes the further reaction more difficult. In the reaction of the colloidal suspension with an organosilicon compound of the general formula (7) in the second reaction step, it is also advantageous to subsequently stir the mixture for a further 1–48 hours after the end of the addition of compounds of the general formula (7), to achieve a reaction which is as complete as possible.

The reaction with organosilicon compounds of the general formulae (8) and (9) in the third reaction step is preferably carried out at 5–95° C., more preferably at 10–85° C., and in particular at 10–40° C. To achieve a reaction which is as complete as possible, it is in turn advantageous to subsequently stir the mixture for a further 1 to 24 hours after the end of the addition of the compounds of the general formulae (8) and (9).

All the customary working-up processes known from polymer synthesis, such as precipitation and subsequent separating off of the polymer, or evaporation of solvents and unreacted starting materials, can be used for working up and isolating the metal-free organopolysiloxane particles. Precipitation of the organopolysiloxane particles with short-chain alcohols is preferred for this procedure, and methanol is a particularly preferred precipitating agent here, with subsequent filtration at room temperature.

The organopolysiloxane particles obtained in the form of a powder are dried, preferably under a high vacuum under a pressure of <0.0001 MPa at 20° C. to 100° C., in particular under a high vacuum at 20° C. to 50° C.

The metal-free organopolysiloxane particles prepared and isolated in process stage A) can also be redispersed.

In the process for the preparation of the metal-containing crosslinked organopolysiloxane particles consisting of a single molecule, the metal content of the organopolysiloxane particles can be deposited in process stage B) on the metal-free organopolysiloxane particles, prepared, for example, by process stage A, by reduction of a metal compound with a reducing agent by, for example, the following processes:

B1) the metal content can be deposited in organic solvents. For this method, the metal-free organopolysiloxane particles are dissolved in a suitable solvent. Examples of suitable solvents are the solvents which are suitable for the metal-containing organopolysiloxane particles.

B1a) the metal content is deposited on metal-free organopolysiloxane particles which carry hydrido-functions (SiH groups). The preferred concentrations of hydrido-functional organopolysiloxanes are at least 1% by weight and not more than 50% by weight, preferably not more than 30% by weight, and in particular not more than 200 by weight, based on the total weight of the solution.

Metal compounds which can be used, and suitable mixtures of metal compounds of various metals are all those which can be reduced to the metal by a silicon hydride bond in the corresponding chemical environment, i.e. have a positive redox potential with respect to hydride-hydrogen transfer, such as noble metal compounds or mixtures thereof, for example platinum compounds such as hexachloroplatinic acid, palladium compounds such as palladium dichloride, ruthenium compounds such as ruthenium trichloride, iridium compounds, rhenium compounds, for example in the form of their trichlorides, gold compounds such as tetrachloroauric acid, silver compounds such as silver perchlorate, copper compounds such as copper sulfate, copper chloride, and copper nitrate, and cobalt compounds such as cobalt nitrate and cobalt chloride.

Metal-free organopolysiloxane particles which carry hydrido functions (SiH groups) are dissolved in a suitable solvent. Examples of suitable solvents are the solvents which are suitable for the metal-containing organopolysiloxane particles.

The metal compounds should be soluble in a solvent which is miscible with the solvent used for the hydrido-functionalized organopolysiloxanes. Suitable solvent classes for the metal compounds and suitable examples of these are the solvents mentioned above for the metal-containing organopolysiloxane particles.

The dissolved reaction partners are then mixed. Mixtures of metal compounds of various metals can optionally be added simultaneously or successively, for example for the preparation of separate various metal colloids on the same metal-free organopolysiloxane particles, it being necessary only to ensure that the total molar amount of metal compounds added does not exceed the molar amount of silicon hydride groups present having a reducing action. Suitable molar ratios of reductive silicon hydride groups to the metal compound or metal compound mixture or to the total metal compounds employed are in the range of the molar ratios from 1:1 to 100,000:1, in particular from 10:1 to 1000:1, and particularly preferably from 10:1 to 100:1.

Mixing can take place during the reaction, but the reaction can also be allowed to proceed without mixing. The reactions are preferably carried out in a temperature range from −80° C. to 150° C., in particular in a temperature range from 0° C. to 100° C., and particularly preferably in a temperature range from 25° C. to 80° C. The reaction times are 1 second to 10 days, preferably 1 minute to 2 hours, and particularly preferably 30 minutes to 1 hour.

After the reduction of the metal, which can be detectable, for example, by the change in color of the solutions, the remaining residual hydrido groups can optionally be saturated by means of a suitable reaction, such as hydrosilylation or alcoholysis. The amount of reactant employed for the after-reaction, in general, depends here on the mathematical molar excess of silicon hydride bonds which should remain on the organopolysiloxane particle after the complete redox reaction. A 1.5- to 5-fold molar excess is preferred here, and a 2-to 5-fold molar excess is particularly preferred.

Suitable substances are all compounds or mixtures of compounds which can react with the hydrogen of the silicon hydride bond, if appropriate under metal catalysis, and increase the storage stability with respect to interparticulate condensation of the particles. Examples of such substances are molecules which carry terminal C=C double bonds, such as alkenes, for example 1-octene. These form stable Si—C linkages via hydrosilylation, as do the alkynes, such as butyne. There may furthermore also be mentioned here macromonomers terminated by vinyl on one or both sides, such as α, ω-vinyl-terminatedpolyalkylsiloxanes, allyl-terminated polystyrenes and allyl-terminated polyethers; and longer-chain, cyclic or aromatic alcohols, such as pentanol, hexanol, cyclohexanol and benzyl alcohol. These react to give Si—O—C compounds, which are relatively insensitive to hydrolysis because of the sterically bulky radical of the alcohol and thus substantially increase the storage stability.

The alkenes are preferred here, and 1-octene is particularly preferred. The after-reaction is preferably carried out at the same reaction temperature as the metal reduction. The after-reaction is particularly preferably carried out at 50° C. to 100° C. The reaction times are preferably 30 minutes to 2 hours, more preferably one hour to 90 minutes.

B1b) The metal content is deposited on metal-free organopolysiloxane particles with added reducing agent. In contrast to stage B1a), in this process a low molecular weight reducing agent which is not bonded to the organopolysiloxane particle is employed. The advantage over stage B1a) is that a wider redox range becomes accessible, and metal compounds which are redox-stable with respect to the silicon hydride bond can also additionally be reduced. Furthermore, this stage is not limited to the hydrido-functionalized metal-free organopolysiloxane particles as carriers, and finally the build-up of metal layer structures on a carrier particle is possible by this process, since the amount of reducing agent available is not correlated to the amount of hydrido-functionalized metal-free organopolysiloxane particles.

Suitable reducing agents are all substances which have a reducing action and dissolve in adequate amounts— preferably, at least 1 by weight—in the solvents suitable for the organopolysiloxanes. Examples of suitable reducing agents are hydrazines such as hydrazine and hydroxylhydrazine; metal borohydrides such as sodium or potassium borohydride; aldehydes such as acetaldehyde; reducing sugars such as fructose and glucose; alcohols such as ethanol;

polyglycol; dihydroxybenzenes such as resorcinol and hydroquinone; alkali metal and alkaline earth metal hydrides such as sodium hydride; aluminum hydrides such as lithium aluminum hydride; and organic acids having a reducing action, or salts thereof, such as citric acid and sodium citrate.

Metal compounds which can be used, and suitable mixtures of metal compounds of various metals, are all those which are reduced to the metal by the reducing agent in the corresponding chemical environment, i.e. have a redox potential which is positive with respect to the reducing agent. Suitable examples are the metal compounds listed for stage 1a) or mixtures thereof, and further metal compounds having an even more positive redox potential.

The metal compounds should be dissolved in a solvent which is miscible with the solvent used for the organopolysiloxane particles and the reducing agent. If appropriate, the solvent can also simultaneously be the reducing agent, such as alcohols or aldehydes. Suitable solvents for the metal compounds are described above for the organopolysiloxane particles.

The dissolved reaction partners are then mixed. Mixtures of metal compounds of various metals can optionally also be added simultaneously or successively, for example for the preparation of separate various metal colloids on the same metal-free organopolysiloxane particle, it being necessary to ensure only that the total amount of metal compounds added does not exceed the amount of reducing agent present. Suitable molar ratios of reducing agent to metal compound or metal compound mixture or to the total metal compounds employed are in the range of the molar ratios from 1:1 to 100:1, preferably from 2:1 to 10:1, and in particular from 1.5:1 to 2:1.

Mixing can take place during the reaction, but the reaction can also be allowed to proceed without mixing. The reactions are preferably carried out in a temperature range from $-80°$ C. to $150°$ C., preferably in a temperature range from $0°$ C. to $100°$ C., and in particular in a temperature range from $25°$ C. to $80°$ C. A redox reaction can furthermore be stimulated by irradiation, for example by UV light. For example, colloids of gold and silver can be deposited in this manner. The reaction times are preferably 1 second to 10 days, more preferably 1 minute to two hours, and in particular 30 minutes to one hour.

B2.) The metal content can be deposited in aqueous dispersion. The dispersed metal-free organopolysiloxane particles prepared in process stage A) are reacted with suitable metal compounds and, if appropriate, with additional reducing agent. Metal-containing organopolysiloxane particles built up in different ways can be prepared by different process steps.

B2a.) The aqueous metal-free organopolysiloxane particle dispersions in which R is preferably a methyl or, in particular, hydrogen radical are employed. The solids content of the dispersions preferably varies here from 0.1% by weight to 25% by weight, more preferably from 4% by weight to 16% by weight, and in particular from 8% by weight to 12% by weight.

All substances which have an effective reducing action in aqueous media and which dissolve to the extent of at least 1% by weight in a solvent mentioned below which is miscible with the organopolysiloxane dispersion are suitable as the reducing agent. Examples of these substances having a reducing action are hydrazine hydroxide, alcohols, hydroquinone, aldehydes, sugars and organic acids, such as citric acid.

Metal compounds which can be used are mentioned above under step B1a). The metal compounds are soluble to the extent of at least 0.01% by weight in a solvent used for the organopolysiloxane dispersion and the reducing agent. Suitable solvents for the metal compounds are water or solvents of unlimited miscibility with water, such as short-chain alcohols, such as methanol, ethanol or isopropanol, ketones, such as acetone, ethers such as dioxane or tetrahydrofuran, dimethylformamide and dimethyl sulfoxide.

The dissolved reaction partners are then mixed. The amounts of metal compounds and ratio to the amount of reducing agent are preferably chosen as mentioned above under step B1a). Mixing can take place during the reaction, but the reaction can also be allowed to proceed without mixing. The reactions are preferably carried out in a temperature range from $0°$ C. to $100°$ C., more preferably in a temperature range from $10°$ C. to $90°$ C., and in particular in a temperature range from $25°$ C. to 700C. A redox reaction can furthermore be stimulated by irradiation, for example by UV light. For example, colloids of gold and silver can be deposited in this manner. The reaction times are 1 second to 10 days, preferably 1 minute to two hours, and in particular 30 minutes to one hour.

If alkoxy and hydroxyl groups which are still capable of condensation are present on the organopolysiloxane particle after the end of the deposition of the metal, these are preferably saturated with an organosilicon compound of the above general formula (7).

In step B2b), an organopolysiloxane layer can again be prepared on the metal-containing organopolysiloxane particle prepared according to step B2a) by condensing onto it trialkoxysilanes or mixtures of di- and trialkoxysilanes. Redispersible, multilayered, metal-containing organopolysiloxane particles can be prepared.

If mixtures of di- and trialkoxysilanes are employed, an elastomer layer can be prepared. Silanes of the above general formula (5) in which a has the value 2 or 3 are preferably employed.

The same or another metal can in turn be deposited on the organopolysiloxane layer, and thereafter again an organopolysiloxane layer. The layers can be applied several times on one another. The last step in this process is the final blocking step for alkoxy and hydroxyl groups which are still capable of condensation on the organopolysiloxane particle using, preferably, an organosilicon compound of the above general formula (7).

The organopolysiloxane dispersions, reducing agents, metal compounds, solvents and ratio of reducing agent: metal compound are described above for process B2a).

In stage C, organopolysiloxane particles which already contain a metal can be provided with a metal coating with the aid of further metal compounds.

The organopolysiloxanes which are prepared according to stage B and contain metal on the particle surface, or aqueous dispersions thereof, can be reacted with metal compounds in an organic or aqueous phase. The noble metal which has already been deposited catalyzes the reduction of the less noble metal on the substrate surface here.

The metal compound here must be soluble in a suitable solvent. For the aqueous dispersions, these are the solvents listed in process step B2b), and for the metal-containing particles soluble in an organic phase, these are the solvents listed in process step B1a) and B1b).

All metal compounds which have a positive redox potential with respect to the reducing agent in the particular chemical environment are suitable. Suitable reducing agents are those mentioned in process step B1a) and B1b). Thus, for example, using reducing agents, layers of nickel, copper or silver or mixtures thereof can be deposited on a particle coated with only a low palladium content.

The metal-containing organopolysiloxane particles prepared in stage B and C can be worked up, isolated and dried in the same way as the metal-free organopolysiloxane particles in stage A.

The metal-containing organopolysiloxane particles can be employed, for example, as homogeneous catalysts or reactions catalyzed by metal, such as hydrosilylations and hydrogenations, in optics for selective absorption of, for example, UV radiation, in electronics, on the basis of magnetic and conductive properties, for coating, on the basis of the above properties, and for flameproofing.

EXAMPLES

In the following examples, unless stated otherwise in each case, a) all amounts are based on weight b) all pressures are 0.10 MPa (absolute)

c) all temperatures are 20° C.

d) PEM=Particle electron microscope e) GPC=Gel permeation chromatography f) DBS=dodecylbenzenesulfonic acid Static and dynamic light scattering were measured with a unit which comprises, inter alia, a Stabilite™ 2060-11s Kr laser from Spectra-Physics, a goniometer Sp-86 from ALV and an ALV-3000 Digital Strukturator/Korrelator. The krypton ion laser operated at a wavelength of 647.1 nm.

Sample preparation: the samples (organopolysiloxane particles in toluene; concentration range as stated in the examples) were filtered three times through Millex™-FGS filters (0.2 μm pore size) from Millipore. The measurement temperature in the light scattering experiments was 20° C. The dynamic light scattering measurements were carried out as a function of the angle from 50° to 130° in 20° steps, and the correlation functions were evaluated with the Simplex algorithms. In the static light scattering experiment, the dependence of the angle of the scattered light was measured from 30° to 140° in 5° steps.

Structural characterization of the organo-polysiloxane particles by means of static and dynamic light scattering was carried out as described in DE-A-195 19 446.

Preparation examples of organosiloxane microgel dispersions and redispersible particles therefrom:

a) Preparation of a Dispersion Comprising Hydrido-functional Organopolysiloxane Microgel Particles 1000 g of deionized water and 4 g of dodecylbenzenesulfonic acid (DBS) are initially introduced into a 2 l three-necked flask at 50° C. 160 g of methyltrimethoxysilane are added dropwise to this solution in the course of 45 minutes and the mixture is subsequently stirred for about 30 minutes. Thereafter, a mixture of 21 g of methyltrimethoxysilane and 19 g of triethoxysilane is added in the course of 30 minutes. The mixture is subsequently stirred at 50° C. for a further 3 hours. The resulting dispersion is filtered.

The solids content of the dispersion is about 8.5% by weight and the hydrogen content is about 0.01% by weight, based on the total weight of the dispersion. Static and dynamic light scattering measurements in water gave an $R_h$ value of 10.5 nm, $R_g$ less than 10 nm and a molar mass of about $2 \times 10^6$ g/mol. A monodisperse decay behavior of the autocorrelation function was found with the dynamic light scattering.

b) Preparation of Organopolysiloxane Microgel Particles with a Hydrido-functionalized Shell 3000 g of deionized water and 12 g of DBS are initially introduced into a 4 l three-necked flask and are heated to 50° C. 600 g of methyltrimethoxysilane are added dropwise to this acidic emulsifier solution in the course of two hours, while stirring. 180 g of trimethylmethoxysilane are then added to the dispersion and the mixture is stirred at room temperature overnight.

The dispersion is then broken with 6000 g of a 20% strength by weight solution of sodium chloride and is filtered and the solid is rinsed first several times with 500 g of water and then several times with 300 g of methanol. The residue is taken up in 1500 g of toluene and the mixture is dried over 200 g of sodium sulfate. The resulting solution is concentrated to 1000 g. 80 g of dihydridotetramethyldisiloxane and 50 g of the acid catalyst Tonsil® OTP. FF (Süd-Chemie AG) are added to the resulting solution at room temperature and the mixture is heated to 70° C. and stirred at this temperature for 2 hours. The solution is then filtered and the filtrate is evaporated to dryness at 40° C. under 1 mbar. 300 g of a white powder are obtained. The hydrogen content of the substance is 0.11% by weight. According to GPC (polystyrene calibration), the polydispersity of the particles is 1.05. The particle dimensions were determined by static and dynamic light scattering in toluene: hydrodynamic radius $R_h$: 11.2 nm; radius of gyration $R_g$: 10 nm; molar mass $3.6 \times 10^6$ g/mol. The ratio of $R_h$ to $R_g$ shows that the particles are spherical.

c) Preparation of an Organopolysiloxane Microgel Particle with a Hydrido-functional Core and a Swellable Shell 500 g of deionized water and 4 g of DBS are initially introduced into a 1 l three-necked flask and are heated to 50° C. 14.5 g of triethoxysilane are added dropwise to this acid emulsifier solution in the course of 15 minutes, while stirring. The dispersion is then stirred for a further 45 minutes and a mixture of 43 g of methyltrimethoxysilane and 56 g of dimethyldimethoxysilane is then added dropwise over a period of 90 minutes. The dispersion is subsequently stirred at 50° C. for a further 2 hours, 30 g of trimethylmethoxysilane are then added and the mixture is subsequently stirred for a further 4 hours.

The dispersion is precipitated with 1000 g of a 20% strength by weight solution of sodium chloride and filtered and the solid is washed first several times with 100 g of water and then several times with 100 g of methanol. The residue is taken up in 500 g of toluene and the mixture is dried over 100 g of sodium sulfate. The resultant solution is concentrated to 200 g. 20 g of dihydridotetramethyldisiloxane and 15 g of the acid catalyst Tonsil® OPT. FF (Süd-Chemie) are added to this solution at room temperature and the mixture is heated to 70° C. and stirred at this temperature for 2 hours. The solution is then filtered and the filtrate is evaporated to dryness at 40° C. under 1 mbar. 48 g of a white powder are obtained. The hydrogen content of the substance is 0.05% by weight. According to GPC (polystyrene calibration), the polydispersity of the particles is 1.1. The particle dimensions were determined by static and dynamic light scattering in toluene: hydrodynamic radius $R_h$: 20.5 nm; radius of gyration $R_g$: 22 nm; molar mass $6 \times 10^6$ g/mol.

d) Preparation of an Organopolysiloxane Microgel Particle with a Hydrido-functional Layer with a Swellable Shell 500 g of deionized water and 4 g of DBS are initially introduced into a 1 l three-necked flask and are heated to 50° C. 25 g of methyltrimethoxysilane are added dropwise to this acid emulsifier solution in the course of 15 minutes, while stirring. The dispersion is then stirred for a further 30 minutes. Thereafter, 9 g of triethoxysilane are added dropwise over a period of 30 minutes. The dispersion is subsequently stirred at 50° C. for a further 30 minutes, and a mixture of 37.2 g of methyltrimethoxysilane and 48.5 g of dimethyldimethoxysilane is then added dropwise in the course of one hour. The dispersion is further stirred at 50° C. for two hours. Further working up is carried out as described in preparation example c). 51 g of a white powder are obtained. The hydrogen content of the substance is 0.03% by weight. According to GPC (polystyrene calibration), the polydispersity of the particles is 1.15. The particle dimensions were determined by static and dynamic light scattering in toluene: hydrodynamic radius $R_h$: 18.5 nm; radius of gyration $R_g$: 20 nm; molar mass $5.2 \times 10^6$ g/mol.

Example 1

(Reaction of metal compounds with highly crosslinked hydrido-functionalized organopolysiloxane particles which can be redispersed in organic solvents, for the preparation of clusters, colloids and layer structures on the particle surface)

1 g of the hydrido-functionalized organosiloxane microgel from preparation example b), hydrogen content 0.11% by weight, is dissolved in 10 g of toluene. Metal salt solutions in methanol or solid metal compounds as listed in Table 1 are added to the solution at room temperature.

The particular mixture is then stirred at room temperature or elevated temperature for a time stated in

TABLE I

Working up is carried out by evaporating off the solvent at 40° C. under a high vacuum or by precipitation of the particles in 100 g of cold (−70° C.) methanol.

| Example | Metal compound | Amount [mg] | Reaction temperature [° C.] | Reaction time [minutes] | Color |
|---|---|---|---|---|---|
| 1a | Hexachloro platinic acid | 50 mg in 0.5 g methanol | 80 | 30 | brown |
| 1b | Hexachloro platinic acid | 100 in 0.5 g MeOH | 80 | 30 | gray-brown |
| 1c | Hexachloro platinic acid | 200 in 0.5 g MeOH | 80 | 30 | black |
| 1d | Hexachloro platinic acid | 400 in 0.8 g MeOH | 80 | 30 | black |
| 1e | Hexachloro platinic acid | 100 mg | 25 | 1.500 | brown |
| 1f | $PdCl_2$ | 100 in 0.5 g MeOH | 25 | 15 | black |
| 1g | $PdCl_2$ | 250 in 0.8 g MeOH | 25 | 15 | black |
| 1h | Silver tosylate | 100 mg | 80 | 60 | yellow |
| 1i | Silver tosylate | 300 mg | 80 | 60 | brown |
| 1j | Tetrachloro-auric acid | 50 in 0.5 g MeOH | 80 | 60 | purple |
| 1k | Tetrachloro-auric acid | 200 in 0.8 g MeOH | 80 | 60 | red-violet |
| 1l | Iridium trichloride | 100 in 0.5 g MeOH | 80 | 30 | black |
| 1m | Rhodium trichloride | 100 in 0.5 g MeOH | 80 | 30 | black |

After the working up, all the products are completely soluble again in toluene. Agreement of the actual with the theoretically calculated metal contents is found by elemental analysis.

The existing oxidation state 0 (zero valent) of the metal is detected by NMR, such as, for example, by $^{195}$Pt-NMR. In all the samples measured, the chemical shift of −6000 ppm characteristic of $Pt^0$ is found.

The metal deposit and the nature thereof on the particle surface can be detected by electron micrographs.

Furthermore, the molecular dimensions are determined by static and dynamic light scattering in solution. The results are listed in Table Ia.

TABLE Ia

| Sample | $R_h$ [nm] | $R_g$ [nm] | Distribution |
|---|---|---|---|
| 1a | 13.5 | 12 | monodisperse |
| 1f | 12 | 11.5 | monodisperse |
| 1j | 11 | 11 | monodisperse |

Example 2

(Analogous to Example 1, but after deposition of the metal, reaction with 1-octene is also carried out.)

2 g of the hydrido-functionalized organosiloxane microgel from preparation example b are dissolved in 15 g of toluene, and 0.5 g of a 10% strength methanolic solution of hexachloroplatinic acid is then added at room temperature, while stirring. The reaction mixture is heated to 80° C. After 30 minutes, 15 g of 1-octene are added at this temperature. The reaction mixture is heated to the reflux temperature and kept there for 15 minutes. After cooling, the product is precipitated in 150 ml of cold methanol at −70° C., filtered off and rinsed several times with cold methanol.

5 g of a gray-white product which is soluble in toluene, tetrahydrofuran and the like are obtained.

Example 3

(Analogously to Example 1, but the metal deposit forms a core or a layer inside the particle.)

Example 3.1 Metal-containing Particle Core 2 g of the hydrido-functionalized organopolysiloxane from preparation example 1c: hydrogen content 0.05% by weight, are dissolved in 15 g of toluene. The metal salt or the metal salt solution is then added at room temperature. The metal compounds and reaction temperatures and times used in each case are summarized in Table II.

TABLE II

| Example | Metal salt | Amount [mg] | Reaction Temperature | Reaction time [minutes] | Color |
|---|---|---|---|---|---|
| 3.1 a | Hexachloro-platinic acid | 200 in 0.8 g cyclo-hexanone | 80° C. | 120 minutes | black-brown |
| 3.1 b | Tetrachloro-auric acid | 100 in 0.5 g methanol | 60° C. | 1500 | purple |
| 3.1 c | Silver tosylate | 150 | 80° C. | 120 | yellow-brown |

The metal-containing cores can be detected by electron micrographs.

Example 3.2: Metal-containing Layer in the Particle 2 g of the hydrido-functionalized organopolysiloxane from preparation example d are dissolved in 15 g of toluene. The metal salt or the metal salt solution is then added at room temperature. The metal compounds and reaction temperatures and times used in each case are summarized in Table III.

TABLE III

| Example | Metal salt | Amount [mg] | Reaction temperature | Reaction time [minutes] | Color |
|---|---|---|---|---|---|
| 3.2 a | Hexachloroplatinic acid | 200 in 0.8 g cyclohexanone | 80° C. | 120 minutes | yellow-brown |
| 3.2 b | Tetrachloroauric acid | 100 in 0.5 g methanol | 60° C. | 1.500 | red-violet |
| 3.2 c | Silver tosylate | 150 | 80° C. | 120 | yellow |

Neither colloids, clusters nor metal-containing cores can be detected by electron micrographs. A thin metal layer must therefore be present.

Example 4

Methylpolysiloxane microgel particles as the base+ external reducing agent.

The synthesis of the methylpolysiloxane microgel particles is described in DE-A-19519446.

5 g of the methylpolysiloxane microgel particle are dissolved in 50 g of toluene at room temperature. A metal salt solution according to Table IV is added to the solution and the mixture is stirred.

Thereafter, the reducing agent according to Table IV is added. After the reaction, the products are precipitated in 500 ml of cold (−70° C.) methanol, filtered off and dried under a high vacuum.

TABLE IV

| Example | Metal salt | Amount [mg] | Reducing agent | Reaction temperature [° C.] | Reaction time [minutes] |
|---|---|---|---|---|---|
| 4a | Hexachloroplatinic acid | 100 in 0.5 g hexanone | 100 mg hydrazine | 25 | 30 |
| 4b | Hexachloroplatinic acid | 200 in 1 g ethanol | ethanol | 80° C. | 180 |
| 4c | Hexachloroplatinic acid | 150 in 1 g cyclohexanone | 0.5 g acetaldehyde | 80° C. | 30 |
| 4d | Palladium dichloride | 100 in cyclohexanone | 100 mg hydrazine | 25 | 10 |
| 4e | Silver tosylate | 100 | 100 mg hydrazine | 80° C. | 15 |
| 4f | Tetrachloroauric acid | 100 | 100 mg hydrazine | 80° C. | 15 |
| 4g | Copper acetylacetonate | 100 | 100 mg hydrazine | 100° C. | 180 |
| 4h | Nickel carbonyl | 100 | 100 mg hydrazine | 50° C. | 240 |

All the samples are soluble in toluene and tetrahydrofuran. With the exception of 4e and 4f, all the products are black. 4e is brown-yellow and 4f is purple.

No loose metal colloids or clusters are visible under the PEM. Only where carrier particles have formed are there also metal clusters and colloids. There are therefore no "free" metal clusters or colloids in the product.

Example 5

(Reduction in aqueous systems with Si-H)

50 g of a $10^{-2}$ molar salt solution are added dropwise to 50 g of the acid (pH is 1 to 2) aqueous dispersion of hydrido-functionalized organopolysiloxane microgel particles from preparation example a at room temperature, while stirring vigorously. Stirring is then continued for a time and at a temperature according to Table V.

TABLE V

| Example | Melt salt | Reaction temperature [° C.] | Reaction time [minutes] |
|---|---|---|---|
| 5a | Hexachloroplatinic acid | 80 | 15 |
| 5b | Palladium dichloride | 25 | 10 |
| 5c | Silver nitrate | 80 | 30 |
| 5d | Tetrachloroauric acid | 80 | 30 |

The resulting dispersions are then brought to 50° C., 5 g of trimethylethoxysilane are added and the mixtures are stirred at this temperature for 2 hours.

These dispersions are broken with 20% strength by weight sodium chloride solution and rinsed several times with completely desalinated water (500 g in total). The residue is taken up in about 100 g of a mixture of 80 parts of toluene and 20 parts of acetone and the mixture is dried over sodium sulfate. The toluene is then stripped off and the residue is dried under a high vacuum at 40° C. for 1 hour.

All the samples are soluble in toluene and tetrahydrofuran.

No loose metal colloids or clusters are visible under the PEM. Only where carrier particles have formed are there also metal clusters and colloids. There are therefore no "free" metal clusters or colloids in the product.

Example 6

(Aqueous systems with external reducing agents)

The synthesis of the dispersion comprising aqueous methylpolysiloxane microgel particles is described in DE-A-19519446. A $10^{-2}$ molar metal salt solution is added to 50 g of a dispersion comprising methylpolysiloxane microgel particles (solids content about 8% by weight) at room temperature, while stirring vigorously. The reducing agent is then added as a 10 solution or in bulk, according to Table V. Thereafter, the mixture is subsequently stirred for a time and at a temperature according to Table VI.

TABLE VI

| Example | Metal salt | Reducing agent in [g] | Reaction temperature [° C.] | Reaction time in [minutes] |
|---|---|---|---|---|
| 6a | Hexachloroplatinic acid | 0.2 g hydroxylamine | 80° C. | 30 |
| 6b | Palladium dichloride | 0.2 g hydroxylamine | 25 | 10 |
| 6c | Silver nitrate | 0.2 g glucose | 50 | 20 |
| 6d | Tetrachloroauric acid | 1 g 10% strength aqueous solution of sodium borohydride | 80 | 30 |
| 6e | Nickel sulfate | 1 g 10% strength aqueous solution of sodium borohydride | 80 | 60 |
| 6f | Copper sulfate | 0.2 g glucose | 80 | 60 |
| 6g | Iridium trichloride | 1 g 10% strength aqueous solution of sodium borohydride | 80 | 60 |

TABLE VI-continued

| Example | Metal salt | Reducing agent in [g] | Reaction temperature [° C.] | Reaction time in [minutes] |
|---|---|---|---|---|
| 6h | Rhodium trichloride | 1 g 10% strength aqueous solution of sodium borohydride | 80 | 60 |

The resulting dispersions are then worked up further as described in Example 5.

All the samples are soluble in toluene and tetrahydrofuran.

No loose metal colloids or clusters are visible under the PEM. Only where carrier particles have formed are there also metal clusters and colloids. There are therefore no "free" metal clusters or colloids in the product.

Example 7

(Reduction by UV irradiation)

50 g of $10^{-2}$ molar silver nitrate solution are added to 50 g of methylpolysiloxane microgel dispersion employed in Example 6 at room temperature, while stirring vigorously. The solution is irradiated with a mercury halogen lamp (1 W) at 25° C. for 15 minutes. A yellow dispersion is obtained.

The dispersion is worked up as described in Example 5. The yellow powder is soluble in toluene and tetrahydrofuran.

No loose metal colloids or clusters are visible under the PEM. Only where carrier particles have formed are there also metal clusters and colloids. There are therefore no "free" metal clusters or colloids in the product.

Example 8

(Building up a layer structure in aqueous dispersions)

20 g of methyltrimethoxysilane are slowly added dropwise to an initial mixture of 500 g of water and 2 g of dodecylbenzenesulfonic acid at 50° C. in the course of 10 minutes, while stirring. 10 minutes after the end of the dropwise addition, 5 g of triethoxysilane are added. The mixture is subsequently stirred for a further 10 minutes. 10 g of a 1% strength hexachloroplatinic acid are then added to the dispersion and the mixture is subsequently stirred for 30 minutes. The solution becomes brown-black. 20 g of methyltrimethoxysilane are then added dropwise in the course of 10 minutes. After a further 10 minutes, 5 g of trimethoxysilane are once again added and the mixture is subsequently stirred for 10 minutes. Thereafter, 10 g of a 1% strength palladium dichloride solution are slowly added to the initial mixture. (The dispersion becomes black). After 10 minutes, 50 g of methyltrimethoxysilane are once again added in the course of one hour.

The dispersion is then worked up as described in Example 5.

The resulting black powder is soluble in organic solvents, such as tetrahydrofuran, toluene and the like.

Use Examples

Example 9

(Hydrogenation)

120 g of a 30% strength by weight solution of 1-octene in cyclohexane are initially introduced into a 200 ml Schlenk tube. 100 mg (corresponding to 4 mg of platinum or 25 ppm of platinum, based on the 1-octene) of the compound prepared in Example 1b are used as a catalyst. The Schlenk tube is then evacuated several times until the solvent boils, in order to degas the solution. Thereafter, hydrogen gas (overpressure of 2 bar) is forced into the stirred solution at room temperature. An exothermic hydrogenation starts immediately. The internal temperature reaches about 65° C. After 30 minutes, the hydrogenation is at an end. only octane can be detected in the GC.

Example 10

(Hydrosilylation)

13.2 g of 1-octene and 13 mg (corresponding to 0.5 mg of platinum, or 18 ppm, based on the total weight of the starting material) of the catalyst prepared in Example 1c are initially introduced into a flask. The solution is heated to 120° C. and 14.8 g of triethoxysilane are added dropwise. The reaction is exothermic. After about 20 minutes, the reaction has proceeded to conclusion.

Example 11

(Coatings)

1 g of the powder prepared in Example 1d is dissolved in 9 g of toluene. A polypropylene film is immersed in this solution for 10 minutes. Thereafter, the film is washed with 3 times 10 ml of acetone and the film is dried at room temperature under normal pressure for two days.

Electron micrographs show a virtually monomolecular layer of metal-containing particles on the substrate surface.

What is claimed is:

1. Crosslinked organopolysiloxane particles which consist of a single molecule, containing metal atoms in the zero valent oxidation state, these atoms in each case being in intermetallic interaction with at least one further metal atom in the oxidation state 0, said particles having an average diameter of 5 to 200 nm, and soluble to the extent of at least 0.1% by weight in at least one organic solvent chosen from the group consisting of methylene chloride, pentane, acetone, toluene and ethanol, at least 80% of the particles having a diameter which deviates from the average diameter by not more than 30%.

2. The organopolysiloxane particles as claimed in claim 1, in which the mean molar masses of said particles are from about $5 \times 10^5$ g/mol to about $10^{10}$ g/mol.

3. The organopolysiloxane particles as claimed in claim 1, in which the relative total content of metal in the zero valent oxidation stage is from about 10 ppm to 50% by weight.

4. The organopolysiloxane particles as claimed in claim 2, in which the relative total content of metal in the zero valent oxidation stage is from about 10 ppm to 50% by weight.

5. The organopolysiloxane particles as claimed in claim 1, in which the organopolysiloxane content essentially consists of 0.5 to 80% by weight of units of the general formula $$[R_3SiO_{1/2}] \tag{1}$$

0 to 99.0% by weight of units of the general formula $$[R_2SiO_{2/2}] \tag{2}$$

0 to 99.5% by weight of units of the general formula $$[RSiO_{3/2}] \tag{3}$$

and, 0 to 99.5% by weight of units of the general formula $$[SiO_{4/2}] \qquad (4),$$

in which
R is a hydrogen atom or identical or different monovalent, SiC-bonded, $C_1$ to $C_{18}$ hydrocarbon radicals which optionally carry functional groups.

6. A process for the flameproofing of a combustible material, said process comprising incorporating into said material, or coating onto said material, the composition comprising the particles of claim 1.

7. The crosslinked organopolysiloxane particles of claim 1, wherein at least three metal atoms of the zero valent oxidation state are in intermetallic interaction.

8. The crosslinked organopolysiloxane particles of claim 1, wherein said particles contain clusters of zero valent metal atoms.

9. The crosslinked organopolysiloxane particles of claim 1, wherein a metal layer not detectable under a particle electron microscope is present.

10. The organopolysiloxane particles of claim 1 wherein at least two zero valent metal layers are present, each zero valent metal layer separated from adjacent zero valent metal layer(s) by a layer of organopolysiloxane.

11. The organopolysiloxane particles of claim 1 wherein said zero valent metal comprises a metal colloid.

12. Crosslinked organopolysiloxane particles which consist of a single molecule, containing metal atoms in the zero valent oxidation state, said particles prepared by the process comprising:

A) preparing an organopolysiloxane component of the organopolysiloxane particles as a colloidal suspension in a first step by metering silanes of the general formula (5)

$$R_aSi(OR^1)_{4-a} \qquad (5),$$

and, if appropriate, organosilicon compounds of the general formula (6)

$$R_b(R^1O)_cSiO_{4-b-c/2} \qquad (6),$$

in which
a has the value 0, 1, 2 or 3,
b and c in each case independently of one another have the values 0, 1, 2, 3 or 4 and
R and $R^1$ independently are hydrogen, or identical or different monovalent, SiC-bonded $C_{1-18}$ hydrocarbon radicals optionally bearing functional groups, into an agitated mixture of emulsifier and water and
in a second step, adding an organosilicon compound of the general formula (7)

$$(R^2{}_3Si)_dY^1 \qquad (7)$$

in which
$Y^1$ if d=1, is a hydrogen atom, $—OR^3$, $—ONR^3{}_2$ or $—OOCR^3$ and if d=2, is —O— or —S—,
$R^2$ and $R^3$ have the meanings of R and
d has the value 1 or 2,
to the colloidal suspension, with the proviso that the organosilicon compounds of the general formula (7) are water-soluble or hydrolyze in water to give a water-soluble compound, and B) depositing a metal content on the metal-free organopolysiloxane particles, which have been prepared according to process stage A, by reduction of a metal compound with a reducing agent.

13. The crosslinked organopolysiloxane particles of claim 12, wherein at least three metal atoms of the zero valent oxidation state are in intermetallic interaction.

14. The crosslinked organopolysiloxane particles of claim 12, wherein said particles contain clusters of zero valent metal atoms.

15. The crosslinked organopolysiloxane particles of claim 12, wherein a metal layer not detectable under a particle electron microscope is present.

16. The organopolysiloxane particles of claim 12 wherein at least two zero valent metal layers are present, each zero valent metal layer separated from adjacent zero valent metal layer(s) by a layer of organopolysiloxane.

* * * * *